(12) United States Patent
Polakowski et al.

(10) Patent No.: US 9,346,518 B2
(45) Date of Patent: May 24, 2016

(54) SNOWMOBILE SUSPENSION SYSTEMS

(71) Applicant: Great Lakes Sound & Vibration, Inc., Houghton, MI (US)

(72) Inventors: Stephen E. Polakowski, Atlantic Mine, MI (US); Christian Muehlfeld, Chassell, MI (US); Cody McKinney, Pinedale, WY (US)

(73) Assignee: Great Lakes Sound & Vibration, Inc., Houghton, MI (US)

( * ) Notice: Subject to any disclaimer, the term of this patent is extended or adjusted under 35 U.S.C. 154(b) by 0 days.

(21) Appl. No.: 14/444,423

(22) Filed: Jul. 28, 2014

(65) Prior Publication Data

US 2015/0034404 A1 Feb. 5, 2015

Related U.S. Application Data

(60) Provisional application No. 61/860,107, filed on Jul. 30, 2013, provisional application No. 61/968,824, filed on Mar. 21, 2014.

(51) Int. Cl.
*B62M 27/02* (2006.01)

(52) U.S. Cl.
CPC ......... *B62M 27/02* (2013.01); *B62M 2027/026* (2013.01)

(58) Field of Classification Search
CPC ........................ B62M 27/02; B62M 2027/026
USPC ............................................... 180/193
See application file for complete search history.

(56) References Cited

U.S. PATENT DOCUMENTS

| 1,916,375 | A | 7/1933 | Knickerbocker |
| 3,773,126 | A | 11/1973 | Irvine |

(Continued)

FOREIGN PATENT DOCUMENTS

| WO | 2013016128 | 1/2013 |
| WO | WO 2013016128 A1 * | 1/2013 |

OTHER PUBLICATIONS

International Search Report and Written Opinion for PCT/US2014/048830, dated Oct. 25, 2014.

(Continued)

*Primary Examiner* — Anne Marie Boehler
*Assistant Examiner* — Felicia L Brittman
(74) *Attorney, Agent, or Firm* — Andrus Intellectual Property Law, LLP

(57) ABSTRACT

A suspension assembly adapted for use in a snowmobile having a closed-loop track includes at least one ground contact engaged with the closed-loop track. An elongated swing arm is angularly disposed in the closed-loop track and extends between a front end portion adapted to be coupled to the chassis, and a rear end portion coupled to the at least one ground contact. A front resilient member is disposed in the closed-loop track and has an upper end pivotably coupled to the front end portion of the swing arm, and a lower end pivotably coupled to the at least one ground contact. A rear resilient member is disposed in the closed-loop track and has an upper end adapted to be pivotally coupled to the chassis, and a lower end pivotally coupled to the at least one ground contact. A pivot arrangement is connected to the swing arm for permitting at least rotation of the swing arm about a pivot axis extending longitudinally of the at least one ground contact. The pivot arrangement includes an arrangement for restricting and/or preventing rotation of the swing arm.

25 Claims, 15 Drawing Sheets

(56) References Cited

U.S. PATENT DOCUMENTS

| | | |
|---|---|---|
| 3,840,083 A | 10/1974 | Woods |
| 3,879,092 A | 4/1975 | Rose |
| 3,887,023 A | 6/1975 | Henning |
| 4,407,386 A | 10/1983 | Yasui et al. |
| 4,502,560 A * | 3/1985 | Hisatomi ............ 180/190 |
| 4,854,556 A | 8/1989 | Pietrzak |
| 5,014,805 A | 5/1991 | Uchida |
| 5,062,507 A | 11/1991 | Roche |
| 5,113,958 A | 5/1992 | Holden |
| 5,265,692 A | 11/1993 | Mallette |
| 5,667,031 A | 9/1997 | Karpik |
| 5,692,579 A | 12/1997 | Peppel et al. |
| 5,727,643 A | 3/1998 | Kawano et al. |
| 5,860,486 A * | 1/1999 | Boivin et al. ........ 180/193 |
| 5,881,834 A | 3/1999 | Karpik |
| 5,944,134 A | 8/1999 | Peppel et al. |
| 6,032,752 A | 3/2000 | Karpik et al. |
| 6,032,754 A | 3/2000 | Izumi et al. |
| 6,070,683 A | 6/2000 | Izumi et al. |
| 6,234,263 B1 | 5/2001 | Boivin et al. |
| 6,234,264 B1 | 5/2001 | Boivin et al. |
| 6,237,706 B1 | 5/2001 | Karpik et al. |
| 6,263,991 B1 | 7/2001 | Savage et al. |
| 6,299,150 B1 | 10/2001 | Allen et al. |
| 6,321,864 B1 | 11/2001 | Forbes |
| 6,354,389 B1 | 3/2002 | Zaczkowski et al. |
| 6,357,543 B1 | 3/2002 | Karpik |
| 6,390,219 B1 | 5/2002 | Vaisanen |
| 6,394,204 B1 | 5/2002 | Haringer |
| 6,502,651 B2 | 1/2003 | Zaczkowski et al. |
| RE38,124 E | 5/2003 | Mallette et al. |
| 6,631,778 B2 | 10/2003 | Mallette |
| 6,926,108 B1 | 8/2005 | Polakowski et al. |
| 7,128,180 B2 | 10/2006 | Polakowski et al. |
| 7,594,557 B2 * | 9/2009 | Polakowski ........ B62M 27/02 180/190 |
| 8,167,073 B2 | 5/2012 | Polakowski et al. |
| 8,640,593 B2 | 2/2014 | Hazan |
| 2008/0055170 A1 | 3/2008 | Madden, Jr. et al. |
| 2014/0202784 A1 | 7/2014 | Mallette |

OTHER PUBLICATIONS

Kaduce, Larry A., Scorpion and Trailroamer Bite The Dust; Aug. 1, 2001, http://www.grovetontrailblazers.com/news/trailroamerl.htm, pp. 1-3, last visited on Oct. 1, 2002 10:52 AM.

Track Suspension Today, The Adjustables, Part 1: Origin & Nomenclature; Supertrax International, Fall 2002, pp. 45-49.

Trail Roamer, Marine Hunting and Outdoor Magazine, pp. 1-3, http://www.sportingjournal.com/main18.shtml, last visited Oct. 1, 2002.

Mountain Addiction Billet Suspension, see www.mountainaddiction.com/pages/l/index.htm, last visited Jun. 9, 2006.

Adboivin Expert, see www.adboivin.com/en/expert.html, last visited Jun. 9, 2006.

* cited by examiner

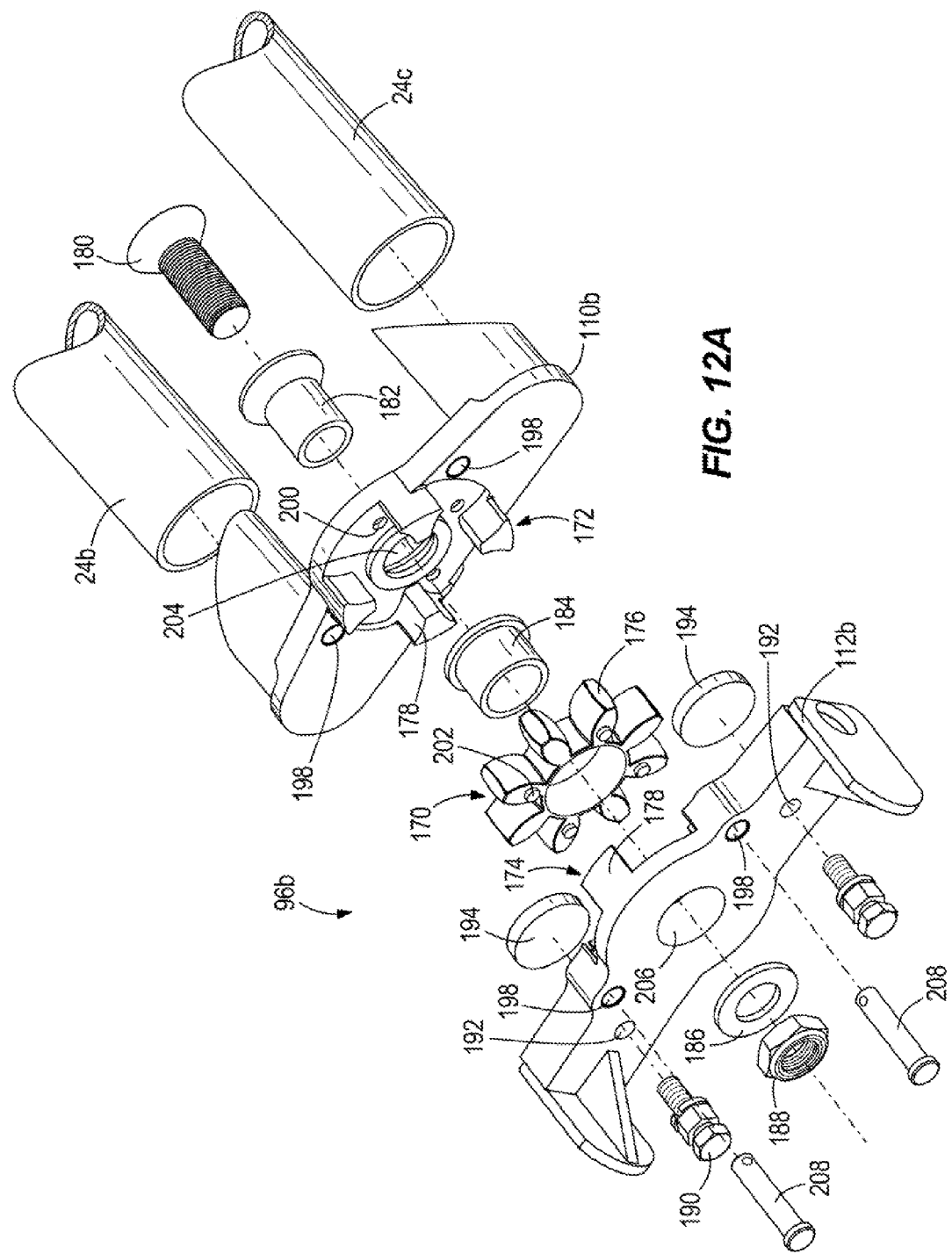

SNOWMOBILE SUSPENSION SYSTEMS

CROSS-REFERENCE TO RELATED APPLICATIONS

This utility application relates to and claims priority of U.S. Provisional Patent Application Ser. No. 61/860,107 filed Jul. 30, 2013 and U.S. Provisional Patent Application Ser. No. 61/968,824 filed Mar. 21, 2014, the disclosures of which are incorporated herein by reference in entirety.

FIELD OF THE INVENTION

The present disclosure relates generally to a suspension system and, more particularly, pertains to a rear suspension system for a snowmobile.

BACKGROUND OF THE INVENTION

U.S. Pat. Nos. 8,167,073 and 7,594,557, which are incorporated herein by reference in entirety, disclose a suspension assembly for a snowmobile that rotatably supports a closed-loop track in the rear tunnel of the snowmobile and also supports both vertical and horizontal travel of the closed-loop track during suspension system travel. The suspension assembly includes at least one elongated ground contact that supports rotational travel of the closed-loop track, and at least one swing arm angularly disposed in the closed-loop track and having a front end portion pivotably coupled to the rear tunnel and a rear end portion coupled to the at least one ground contact. In the preferred arrangement, a front resilient member is arranged to bias against displacement between the chassis and the at least one ground contact during suspension assembly travel, and a rear resilient member arranged to bias against displacement between the chassis and the swing arm during suspension assembly travel. A tensioner couples the rear portion of the swing arm to the at least one ground contact. The tensioner is extendable and retractable during movement of the suspension assembly to maintain the closed-loop track at a generally uniform tension during assembly movement.

U.S. Pat. Nos. 7,128,180 and 6,926,108, which are incorporated herein by reference in entirety, disclose a rear suspension system for a snowmobile that includes a plurality of adjacent closed-loop tracks disposed in a rear tunnel of the snowmobile. Each of the plurality of adjacent closed-loop tracks are rotatably driven by a drive system. One of a plurality of independent suspension assemblies is disposed in each closed-loop track and the plurality of independent suspension assemblies articulate independently of each other during travel of the rear suspension system.

SUMMARY OF THE INVENTION

The present disclosure deals with control and maneuverability issues associated with single track suspension systems in which ground forces acting on the lower portion of the suspension assembly during snowmobile use must travel through the longitudinal or fore-aft axis of the system before affecting the snowmobile chassis and the rider. Known single track suspension designs do not adequately address such ground forces and result in decreased handling, performance and ride comfort. In contrast, the suspension system disclosed herein, provides desirable results when single track suspension systems are subject to random angular displacement which causes rotation of suspension elements about the fore-aft axis of the system.

The present disclosure relates to a suspension assembly adapted for use in a snowmobile having a chassis enclosing a drive system for rotatably driving a closed-loop track. The suspension assembly includes at least one elongated ground contact engaged with the closed-loop track. An elongated swing arm is angularly disposed in the closed-loop track. The swing arm extends between a front end portion adapted to be coupled to the chassis, and a rear end portion coupled to the at least one ground contact. A front resilient member is disposed in the closed-loop track and has an upper end pivotably coupled to the front end portion of the swing win, and a lower end pivotably coupled to the at least one ground contact. A rear resilient member is disposed in the closed-loop track and has an upper end adapted to be pivotally connected to the chassis, and a lower end pivotably coupled to the at least one ground contact. A pivot arrangement is coupled to one of the front end portion and the rear end portion of the swing arm for permitting at least rotation of the swing arm about a pivot axis extending longitudinally of the at least one ground contact.

In one example, the pivot arrangement is comprised of a plate assembly connected to the front end portion of the swing arm, and pivotally connected about the pivot axis to a member adapted to be connected to the chassis of the snowmobile. The plate assembly is provided with a connector adapted to couple with the upper end of the front resilient member.

In another example, the pivot arrangement is comprised of a plate assembly provided with a pair of plates connected together for rotation relative to one another about the pivot axis. A first plate is connected to the rear end portion of the swing arm and the lower end of the rear resilient member. A second plate is connected to the at least one ground contact such that the ground contact and the swing arm are arranged for relative rotation about the pivot axis. The first plate is fixedly secured to the rear end portion of the swing arm, and is pivotably connected to the lower end of the rear resilient member. The at least one ground contact is comprised of a pair of spaced apart ground contacts. Arm alignment guards are constructed on the pair of spaced apart ground contacts for providing lateral support thereof and are configured for engagement with the swing arm. The upper end of the front resilient member is provided with a first spherical joint assembly, and the lower end of the front resilient member is provided with a second spherical joint assembly. The lower end of the rear resilient member is provided with a third spherical joint assembly.

The present disclosure also relates to a suspension assembly adapted for use in a snowmobile having a chassis enclosing a drive system for rotatably driving a closed-loop track. The suspension assembly includes a pivot plate assembly provided with a pair of plates connected together for rotation relative to one another about a pivot axis extending longitudinally of the at least one ground contact. A first plate is connected to the rear end portion of the swing arm and the lower end of the rear resilient member, and a second plate is connected to the ground contact. The ground contact and the swing arm are arranged for relative rotation about the pivot axis.

The first plate is fixedly secured to the rear end portion of the swing arm, and is pivotably connected to the lower end of the rear resilient member. The at least one ground contact is comprised of a pair of spaced apart ground contacts, and the pivot plate assembly is positioned between the pair of spaced apart ground contacts. The pair of spaced apart ground contacts is provided with arm alignment guards engagable with the swing arm along the length thereof for preventing over-rotation of the ground contacts about the pivot axis. The pivot plate assembly is constructed with a lockout arrangement for preventing relative rotation between the first plate and the second plate. The lockout arrangement includes a set of lockout pins which extend through the first plate and the second plate. The pivot plate assembly is constructed further with a rotation limiting arrangement for restricting relative rotation between the first plate and the second plate. In one version, the rotation limiting arrangement includes a lovejoy coupler positioned between the first plate and the second plate. In another version, the rotation limiting arrangement includes a bracket connected to the second plate and provided with an arm arrangement having adjustment bolts which are engagable with the first plate. The rear end portion of the swing arm is connected to the first plate preferably at an angle in the range of 4 degrees-10 degrees and more particularly at an angle of 7 degrees.

The present disclosure further relates to a suspension assembly adapted for use in a snowmobile having a chassis enclosing a drive system for rotatably driving a closed-loop track. The suspension assembly includes a pivot arrangement connected to the swing arm for permitting at least rotation of the swing arm about a pivot axis extending longitudinally of the at least one ground contact. The pivot arrangement further includes an arrangement for providing at least one of restricting and preventing relative rotation of the swing arm.

BRIEF DESCRIPTION OF THE DRAWINGS

FIGS. 12A and 12B are respective exploded rear and front perspective views of the pivot plate assembly shown in FIG. 11.

DETAILED DESCRIPTION OF THE INVENTION

Figure 1A:
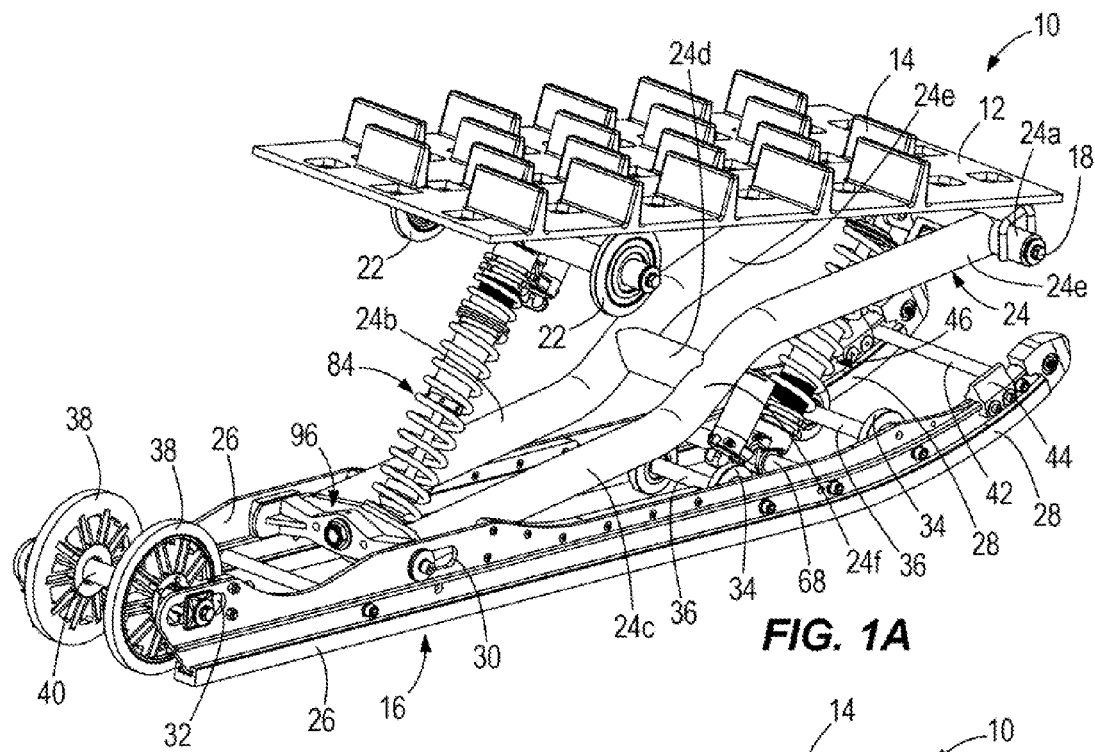
FIGS. 1A and 1B are a right rear perspective view and a rear view, respectively, of one example of a suspension system in a fully extended position without any angular displacement.

The present disclosure relates to a rear suspension system 10 adapted to be used in a snowmobile of the type such as is disclosed in U.S. Pat. No. 8,167,073, which is herein incorporated in entirety.

In general, the rear suspension system 10 includes a closed-loop track 12, a portion of which is depicted in FIGS. 1A, 1B, 2A, 2B, 3A and 3B. The closed-loop track 12 is provided with a series of ground engaging lugs or cleats 14, and is adapted to be rotatably driven by a drive system of the snowmobile to propel the snowmobile in a desired direction as is well known. The rear suspension system 10 also includes an independent suspension assembly 16 which is disposed within the closed-loop track 12, and is designed to articulate during travel of the snowmobile. The assembly 16 is arranged to provide tension in the rotating track 12 and yet allow for increased contact between the track 12 and the ground over rough terrain and during snowmobile acceleration and deceleration. The assembly 16 comprises various components which will be structurally described in detail below followed by a description of the functional interrelation thereof.

As shown in the aforementioned figures, the suspension assembly employs a front elongated cylindrical cross-shaft 18 and a rear elongated cylindrical cross-shaft 20 extending transversely through the closed-loop track 12. The front and rear cross-shafts 18, 20, respectively, are adapted to be coupled to respective front and rear portions of the snowmobile. The front cross-shaft 18 and the rear cross-shaft 20 provide respective front and rear centerlines of rotation for the suspension assembly 16, and further provide means for coupling the suspension assembly 16 to a chassis of the snowmobile. It should be understood that alternate means are contemplated in place of the cross-shafts 18, 20 for rotatably coupling and supporting the suspension assembly 16 during articulation thereof. A pair of spaced apart idler wheels 22 rotates about the rear cross-shaft 20, and supports the rotational movement of the closed-loop track 12.

Figure 1B:
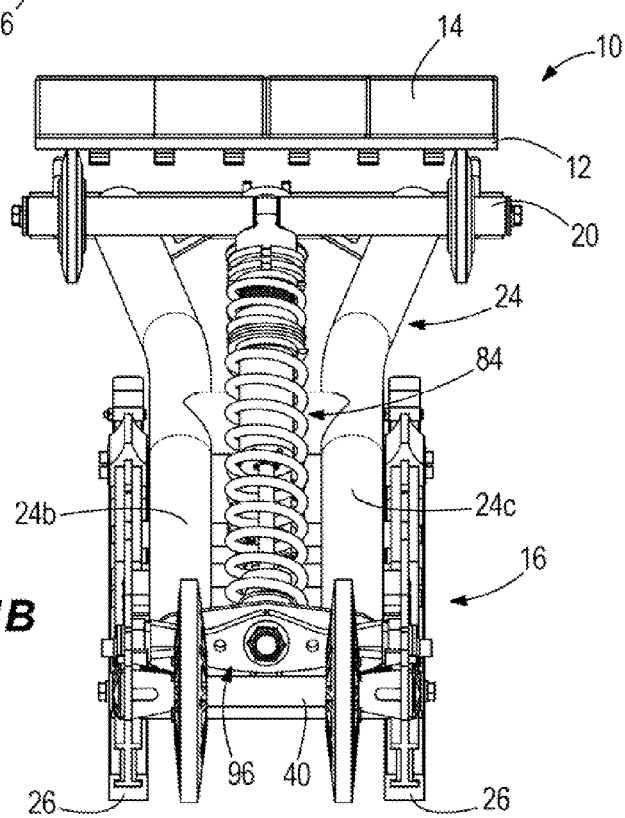
Figure 2A:
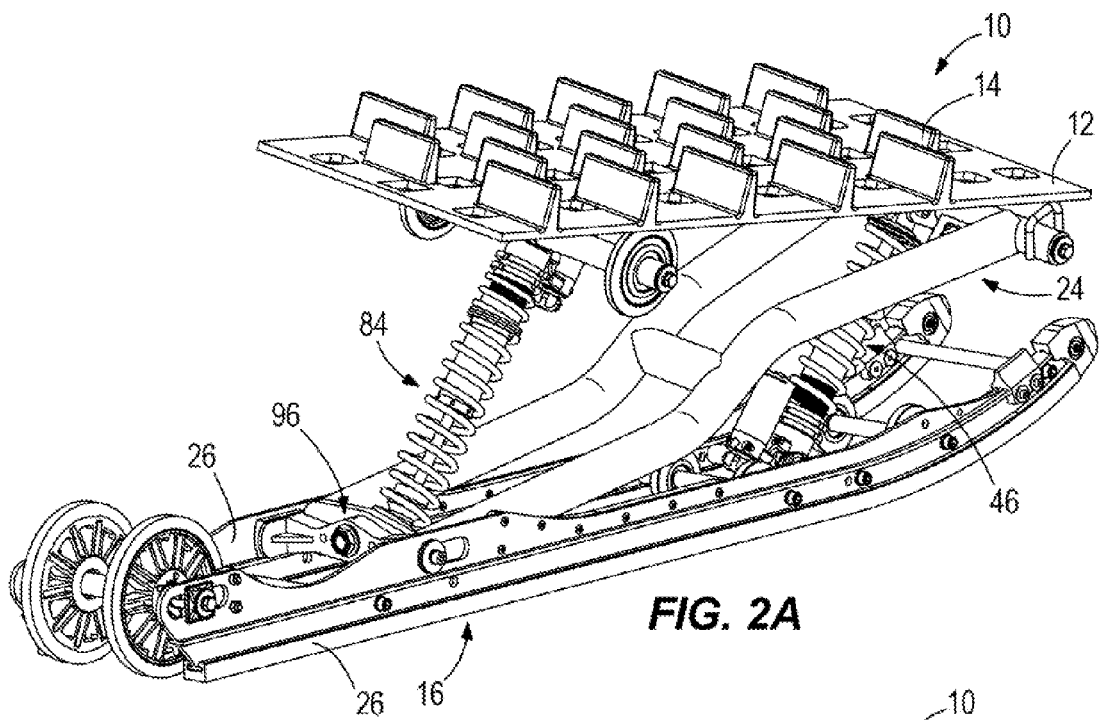
FIGS. 2A and 2B are a right rear perspective view and a rear view, respectively, of the suspension system in a fully extended position with random angular displacement to one side of the suspension system.
Figure 2B:
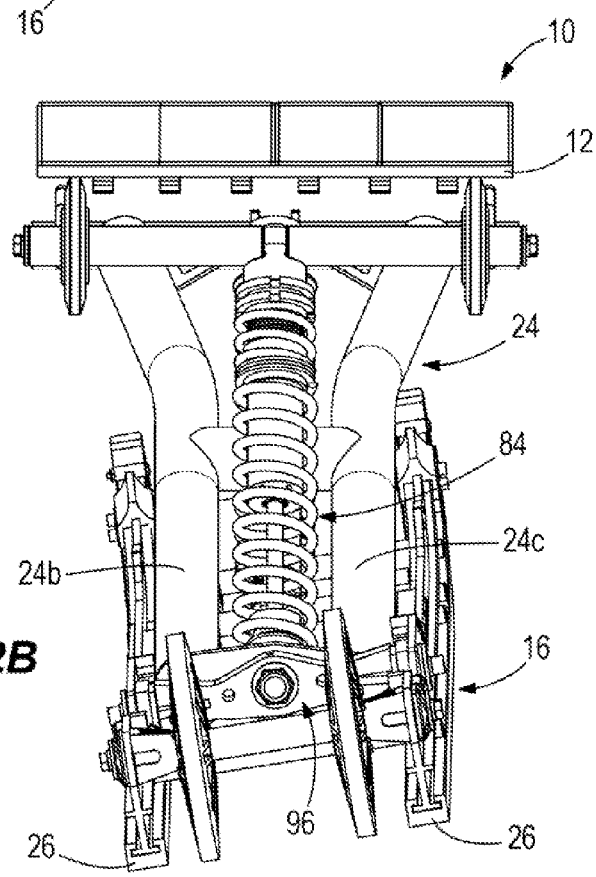
Figure 3A:
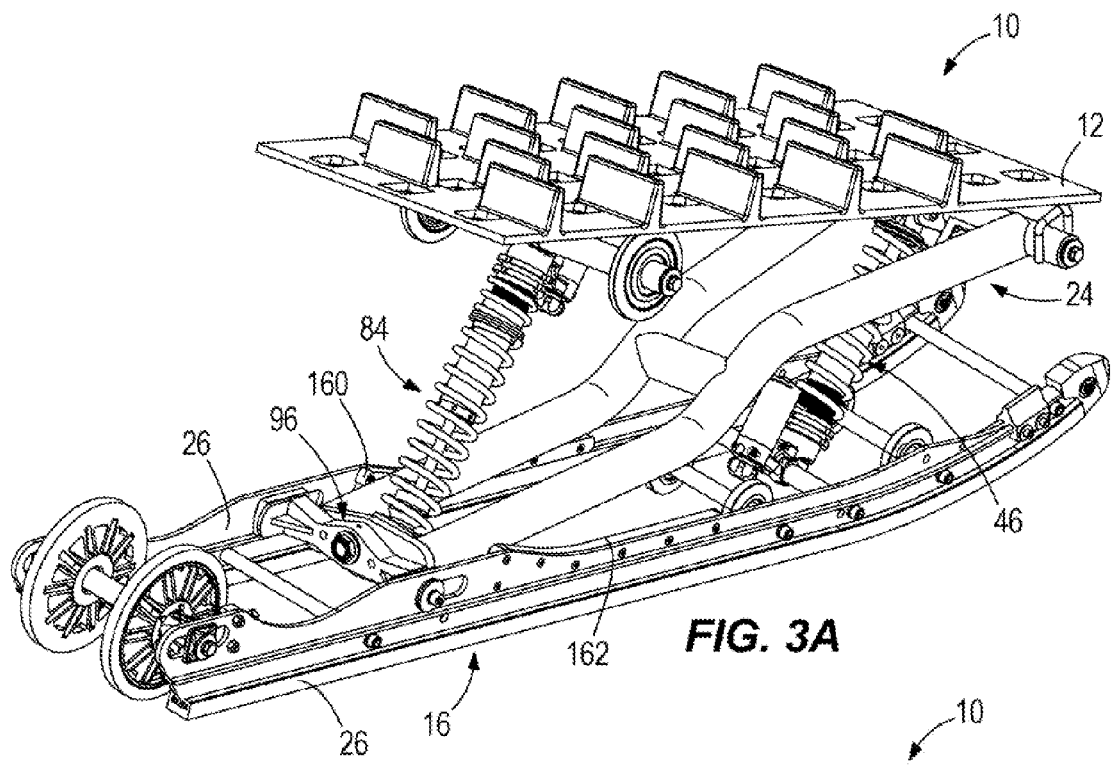
FIGS. 3A and 3B are a right rear perspective view and a rear view, respectively, of the suspension assembly in a fully extended position with random angular displacement to an opposite side of the suspension system.
Figure 3B:
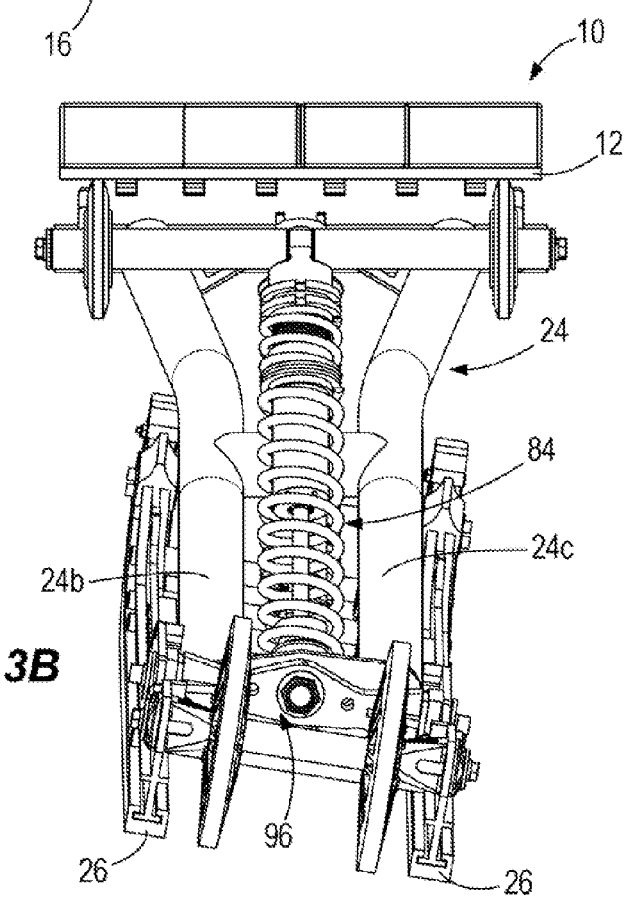

The suspension assembly 16 has a central articulating suspension linkage or swing arm 24 having an upper transverse tube 24a which is rotatably secured to the front cross-shaft 18 for rotation relative to the axis of the cross-shaft 18 and the chassis of the snowmobile. During suspension travel, the swing arm 24 transfers suspension weight and moment among various linkages to support the snowmobile and provide a smooth ride. The swing arm 24 extends transversely from the first cross-shaft 18 and angularly through the closed-loop track 12. In the preferred embodiment, the swing arm 24 is a single, unitary structural linkage that has a pair of elongated structural support members 24b, 24c which are preferably cylindrically shaped and which are fixed together by an intermediate transverse tube 24d. The elongated members 24b, 24c of the swing arm 24 include downwardly converging portions 24e, then downwardly curved portions 24f and then extend rearwardly. The portions of the elongated members 24b, 24c extending below the tube 24d lie generally parallel to each other as best seen in FIGS. 1B, 2B and 3B. Such an arrangement has been found to be advantageous because contact between the swing arm 24 and the rear cross-shaft 20 is avoided when the swing arm 24 rotates about the front cross-shaft 18 during snowmobile travel.

A lower portion of the suspension assembly 16 has a pair of elongated skid rails or ground contacts 26 upon which the closed-loop track 12 rides. Although two ground contacts are employed, it is conceived that the suspension 16 assembly could be formed with a single ground contact or three or more ground contacts. In the preferred arrangement, the ground contacts 26 are longitudinal members having curved forend tips 28, and each ground contact 26 lies within the closed-loop track 12. Upper and rearward portions of the ground contacts 26 are formed with a first pair of slots 30 and a second pair of slots 32 for a purpose to be described below. As the closed-loop track 12 is driven in rotation by the drive system of the snowmobile, an inner surface of the track 12 slides along the length of the ground contacts 26. Bearing the weight of the snowmobile, the ground contacts 26 apply pressure to the inner surface of the closed-loop track 12 and, in turn, apply pressure to the ground, thus resulting in motion of the snowmobile.

Several idler wheels are provided to assist translation of the closed-loop track 12 along the ground contacts 26. More specifically, sets of front idler wheels 34 are rotatably mounted on cross-shafts 36 inboard of the ground contacts 26, and a pair of rear idler wheels 38 is rotatably mounted on a shaft 40. The idler wheels 38 and the shaft 40 can be moved back and forth relative to the slots 32, such as by using an adjustment bolt 41 (FIG. 11) so as to adjust tension on the track 12 at the rear of the suspension system 10. Support bars 42 extend between the ground contacts 26 to provide stability and prevent any excessive scissor-like movement between the ground contacts 26 during system travel.

The forends 28 of the ground contacts 26 are preferably provided with rubber stops 44. The stops 44 are positioned to prevent the ground contacts 26 from contacting the upper end of the swing arm 24 and the front cross-shaft 18 as the lower end of the suspension assembly 16 rotates rearward, and the angle between the track 12 and the drive wheels of the snowmobile decreases.

Figure 4:
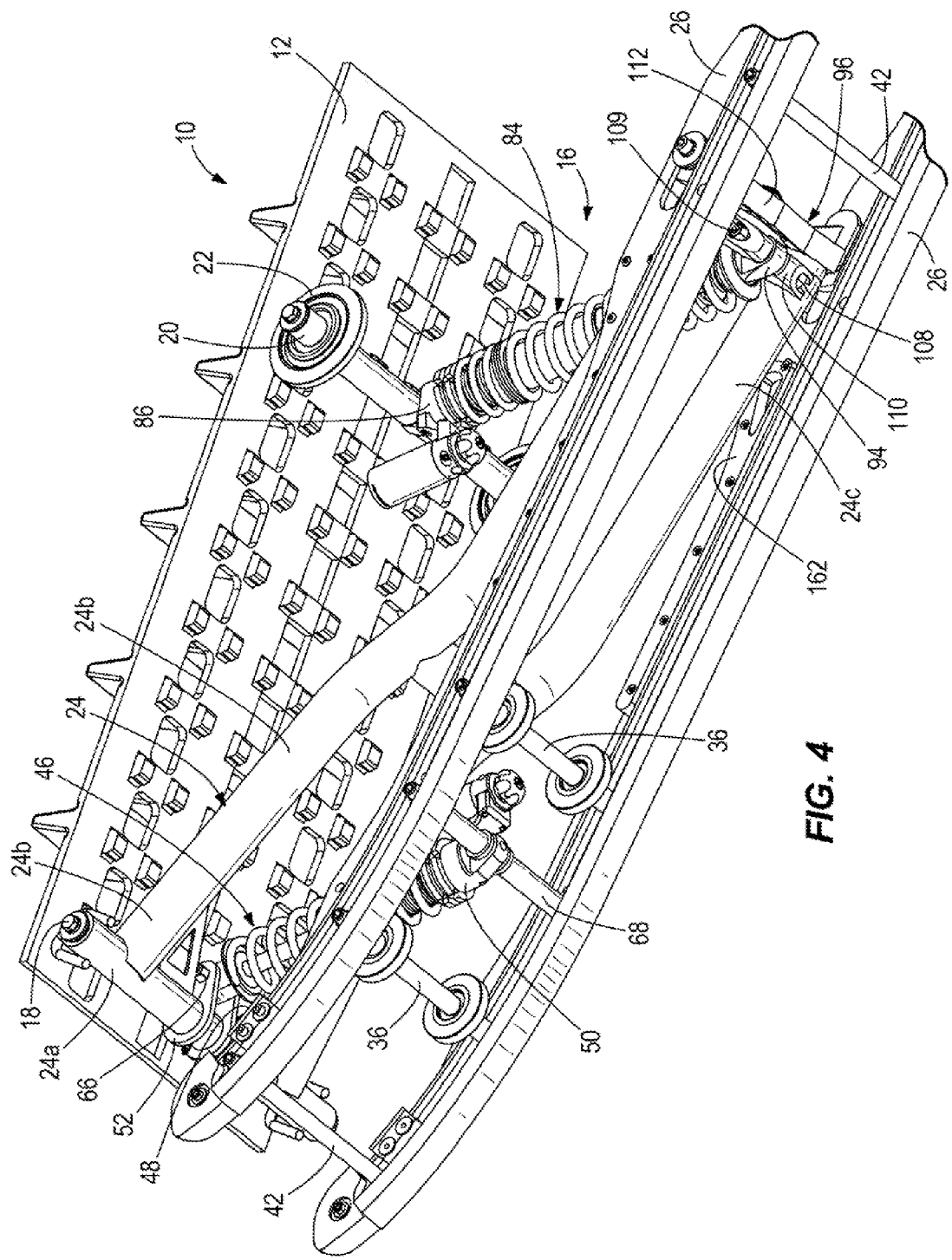
FIG. 4 is a bottom perspective view of the suspension system.
Figure 5A:
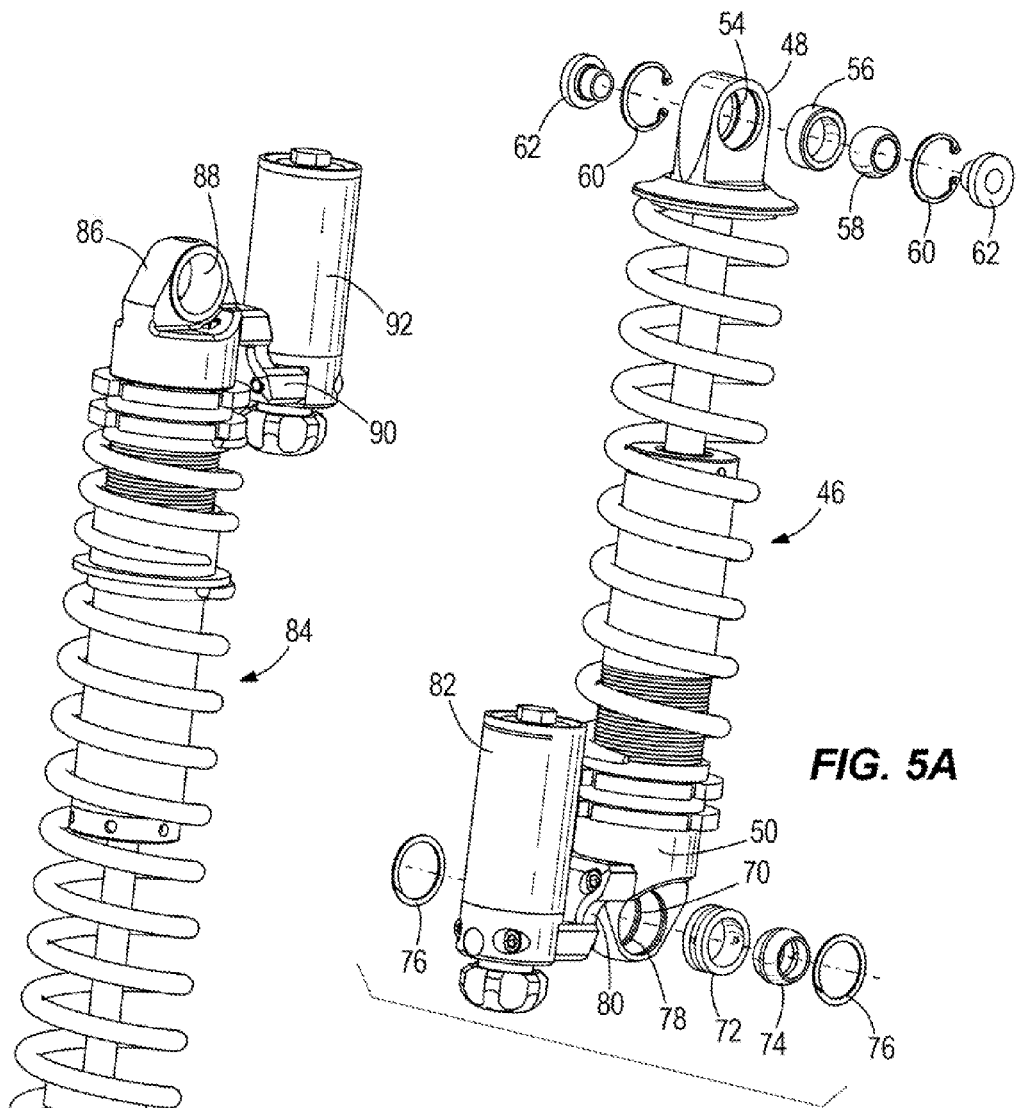
FIG. 5A is an enlarged perspective view of a front resilient member used in the suspension system and provided at upper and lower ends with a spherical joint assembly shown exploded therefrom.

With further reference to FIGS. 4 and 5A, a front resilient member 46 is disposed in the independent suspension assembly 16. Preferably, the front resilient member 46 comprises a spring and/or shock absorbing member which is well known and used in the art for vehicle suspension. The front resilient member 46 may be comprised of a variety of known spring or shock members, such as air shocks, air springs, ride springs, coil springs and/or multiple types of shock absorbers. In the preferred embodiment, the front resilient member 46 is comprised of a coil over spring element. The front resilient member 46 biases against displacement between the swing arm 24 and the pair of ground contacts 26 during suspension travel to resiliently support and dampen movement of the track 12 and soften the ride of the snowmobile.

The front resilient member 46 has a first or upper end 48 coupled to the swing arm 24, and a second or lower end 50 coupled to the pair of ground contacts 26. As will be described hereafter, the first end 48 and the second end 50 are configured with spherical joint assemblies which provide lateral and rotational freedom to the skid rails or ground contacts 26 during snowmobile operation. More specifically, a pivotable bracket or a clevis connector 52 couples the first end 48 of the front resilient member 46 to the upper transverse tube 24a of the swing arm 24. The upper end 48 of the front resilient member 46 has a mounting hole 54 which receives and retains a first spherical joint assembly including a circular retaining collar 56 and a spherical bearing 58 received in the collar 56. The collar 56 and the spherical bearing 58 are held within the mounting hole 54 by a pair of C-clips 60 and press-fit bushings 62 which are inserted from opposite sides of the mounting hole 54. As seen in FIG. 4, the upper end 48 with the first spherical joint assembly is held between bifurcated members of the clevis connector 52 by a nut 64 secured to a bolt 66 passed through the aligned openings in the clevis connector 52, the collar 56, the spherical bearing 58 and the bushings 62.

The second end 50 of the front resilient member 46 is selectively coupled to a crossbar 68 which extends and is secured between the ground contacts 26. However, it is contemplated that the second end 50 may alternatively be coupled to a different cross-shaft, such as one of the cross-shafts 36. Adjustment of the point of coupling of the second end 50 along the ground contacts 26 adjusts the height and ride characteristics of the snowmobile, as will be apparent to those skilled in the art.

The second end 50 on the front resilient member 46 has a mounting hole 70 which receives and retains a second spherical joint assembly including a retaining collar 72 and a spherical joint 74. Circular retaining rings 76 are snap-fit into grooves 78 formed in the wall defining the mounting hole 70, and function to hold the spherical joint assembly in place so that the crossbar 68 can pass therethrough. In the exemplary embodiment, the second end 50 is placed in fluid communication by means of a coupler 80 with an external reservoir 82 that contains an internal floating piston.

Figure 5B:
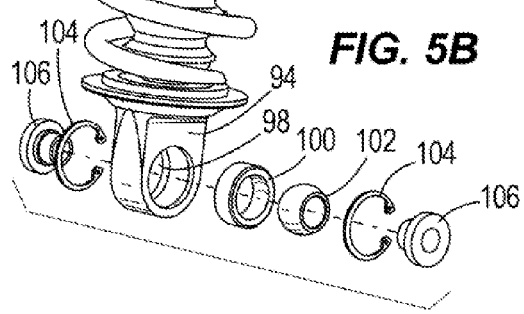
FIG. 5B is an enlarged perspective view of a rear resilient member used in the suspension system and provided at a lower end with a spherical joint assembly shown exploded therefrom.

Referring now to FIGS. 4 and 5B, a rear resilient member 84 is also disposed in the independent suspension assembly 16. Preferably, the rear resilient member 84 comprises a spring and/or shock absorbing member which is well known and used in the art for vehicle suspension. The rear resilient member 84 may be comprised of a variety of known spring and/or shock absorbers, such as air shocks, air springs, ride springs, coil springs and/or multiple types of shock absorbers. In the preferred embodiment, the rear resilient member 84 is comprised of a coil over spring element. The rear resilient member 84 biases against displacement between the rear cross-shaft 20 and the swing arm 24 during travel of the snowmobile system 10 to resiliently support and dampen movement of the closed-loop track 12 to soften the ride of the snowmobile.

Figure 8:
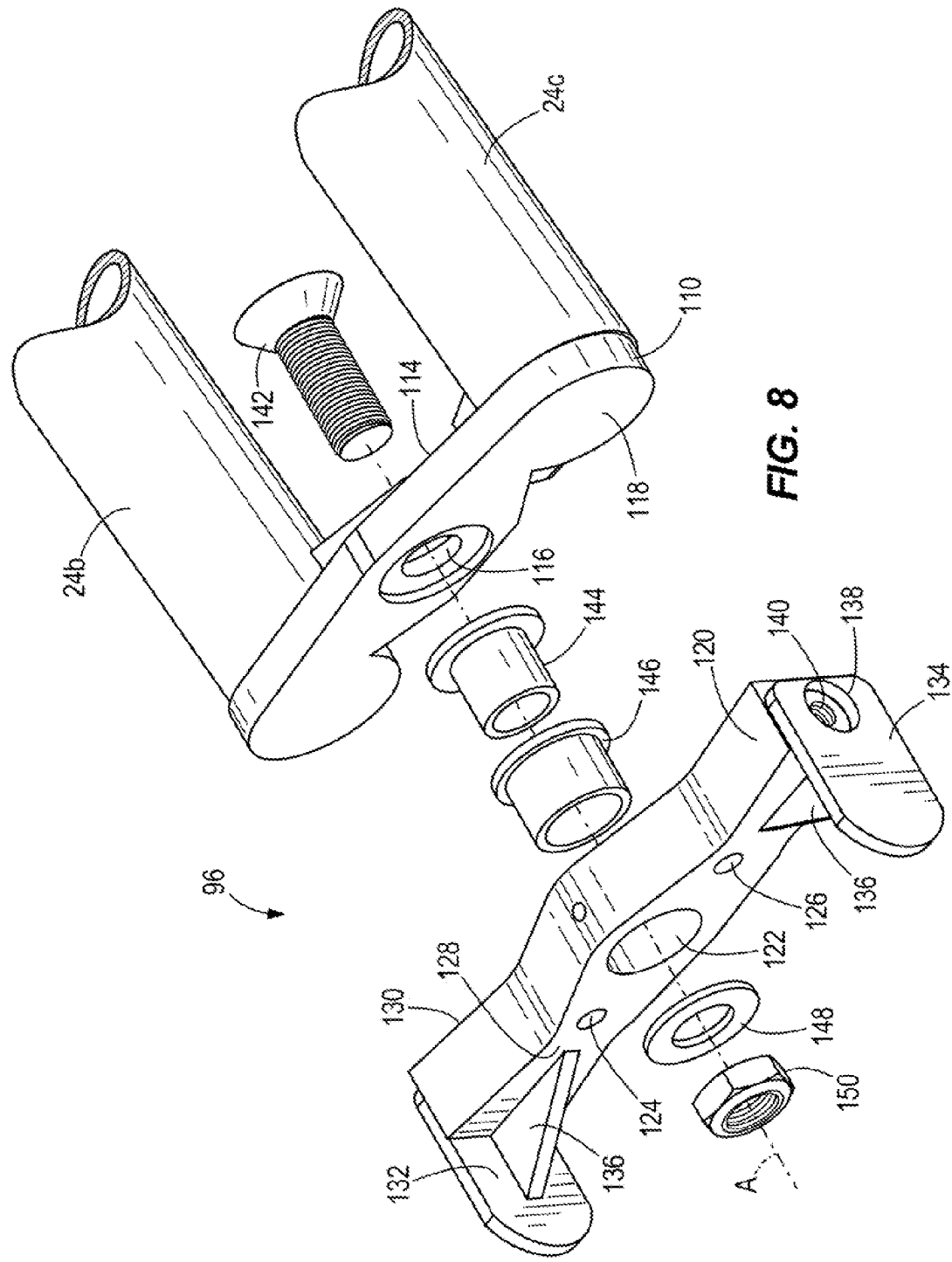
FIG. 8 is an exploded view of the pivot plate assembly shown in FIG. 6A.

The rear resilient member 84 has a first or upper end 86 formed with a mounting hole 88 which rotatably receives and retains the rear cross-shaft 20. The first end 86 is placed in fluid communication by means of a coupler 80 with an external reservoir 92 that contains an internal floating piston. The rear resilient member 84 has a second or lower end 94 which is swingably attached to a portion of a pivot arrangement 96 that is fixed to rearward ends of the swing arm members 24b, 24c as best depicted in FIGS. 4 and 8. The second end 94 has a mounting hole 98 which receives and retains a third spherical joint assembly including a circular retaining collar 100 and a spherical bearing 102 received in the collar 100. The collar 100 and the spherical bearing 102 are held within the mounting hole 98 by a pair of C-clips 104 and a pair of press-fit bushings 106 which are inserted from opposite sides of the mounting hole 98. The lower end 94 with the third spherical joint assembly forms an aligned hole arrangement which receives a shaft of a bolt 108 secured by a nut 109 provided on a bottom surface of the pivot arrangement 96 as best seen in FIG. 4. The third spherical joint assembly including the spherical bearing 102 minimizes lateral and rotational loads that are transferred to the rear resilient member 84 during snowmobile travel.

The pivot arrangement 96 shown in the exemplary embodiment of FIGS. 6A, 6B, 7A, 7B, 8 and 9 is preferably a pivot plate assembly which extends between the ground contacts 26 at the rear of the suspension assembly 16, and is coupled to the lower ends of the swing arm members 24b, 24c as well as the lower end 94 of the rear resilient member 84 as described above. The pivot plate assembly 96 is configured to provide relative rotational freedom of the swing arm 24 and the ground contacts 26 about a pivot axis A extending longitudinally of the ground contacts 26 to improve handling and performance of the snowmobile. Such rotation is in addition to the rotation of the swing arm 24 at its upper end about the transverse axis of the front cross-shaft 18.

Figure 9:
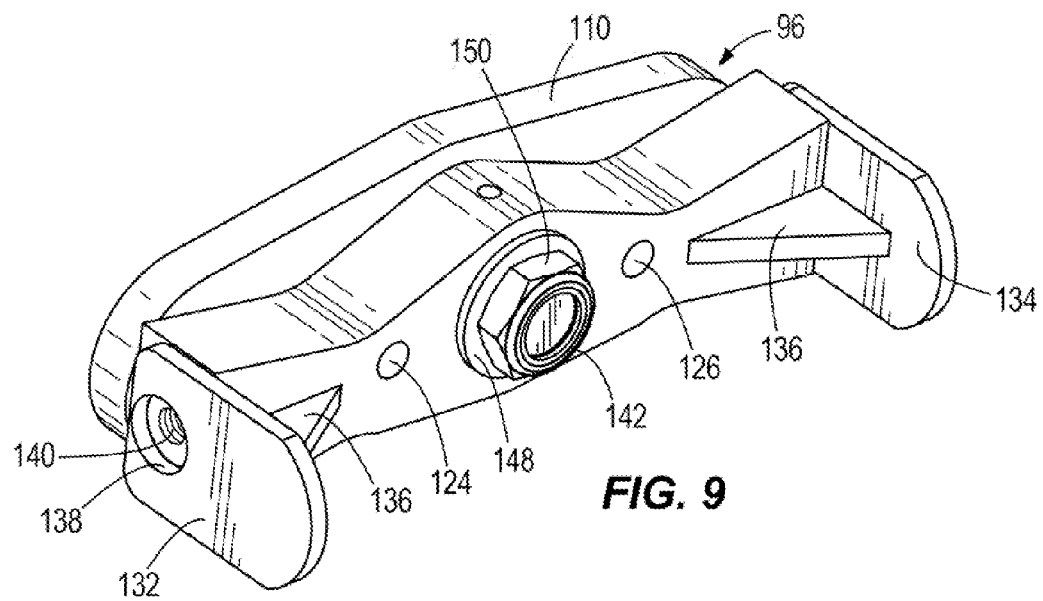
FIG. 9 is an assembled perspective view of the pivot plate assembly shown in FIG. 8.

The pivot plate assembly 96 is comprised of a first or front pivot plate 110 which is pivotably connected about the pivot axis A to a second or rear plate 112. As best seen in FIG. 8, a front facing surface 114 of the plate 110 is fixed to the rear ends of the swing arm members 24b, 24c. The bottom surface of the plate 110 is provided with the bolt 108 as described above. A counter-sunk center throughhole 116 is formed in the plate 110, and extends from a rear-facing surface 118 to the front facing surface 114. The plate 112 has a main body 120 formed with a central throughhole 122 and a pair of laterally spaced apertures 124, 126 extending from a rear facing surface 128 to a front facing surface 130. Opposite sides of the main body 120 are provided with rearwardly extending sidewalls 132, 134 which are connected by braces 136 to the rear facing surface 128. The sidewalls 132, 134 are configured with countersunk holes 138 which are formed with internal threads 140. The pivot plate assembly 96 also includes a threaded fastener 142, a first cylindrical bushing 144 received in a second cylindrical bushing 146, a washer 148 and a nut 150. The throughholes 116, 122 and the bushings 144, 146 are sized and shaped such that when the fastener 142 is passed through the throughhole 116, the bushings 144, 146, the throughhole 122, the washer 148 and connected to the nut 150, the assembled pivot plate assembly 96 is formed as shown in FIG. 9 such that there is relative rotation between the plates 110, 112 about the pivot axis A.

Figure 6A:
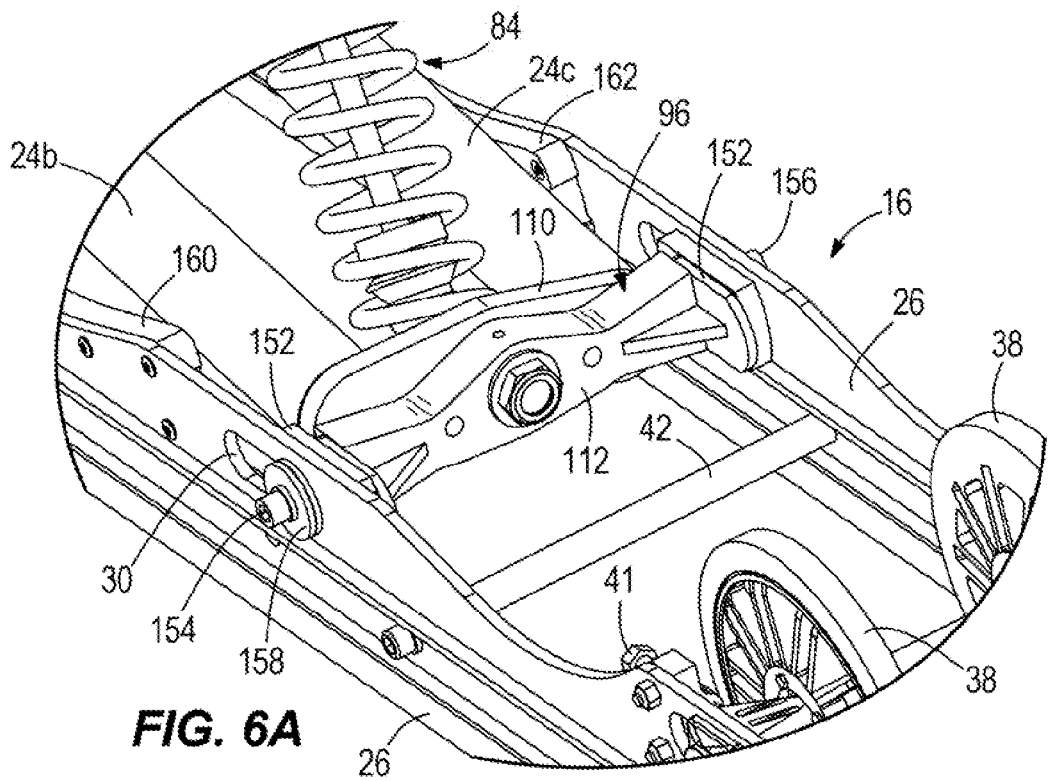
FIG. 6A is a perspective view of a first exemplary embodiment of a pivot plate assembly shown mounted at a lower rear end of the suspension system.
Figure 6B:
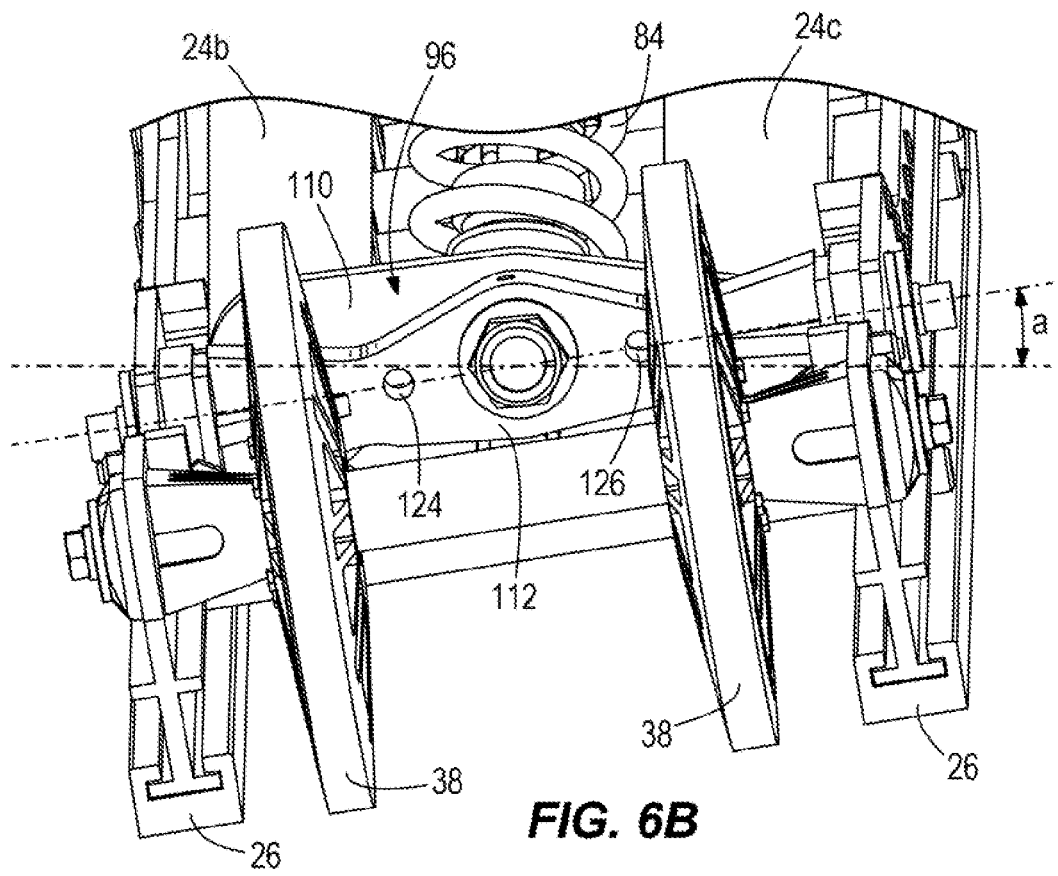
FIG. 6B is an enlarged rear view of FIG. 2B showing the pivot plate assembly of FIG. 6A.
Figure 7A:
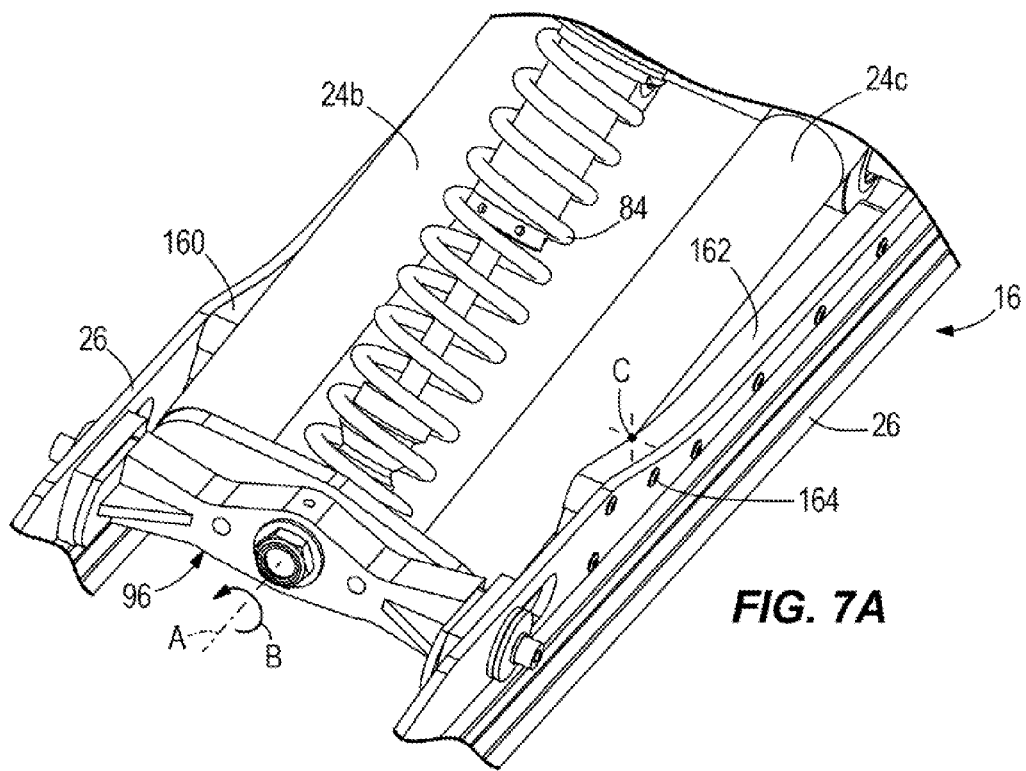
FIGS. 7A and 7B are perspective views of lower rear portions of the suspension system illustrating progressive contact between a swing arm and an arm alignment guard during rotation of the swing arm about an axis passing through the pivot plate assembly.
Figure 7B:
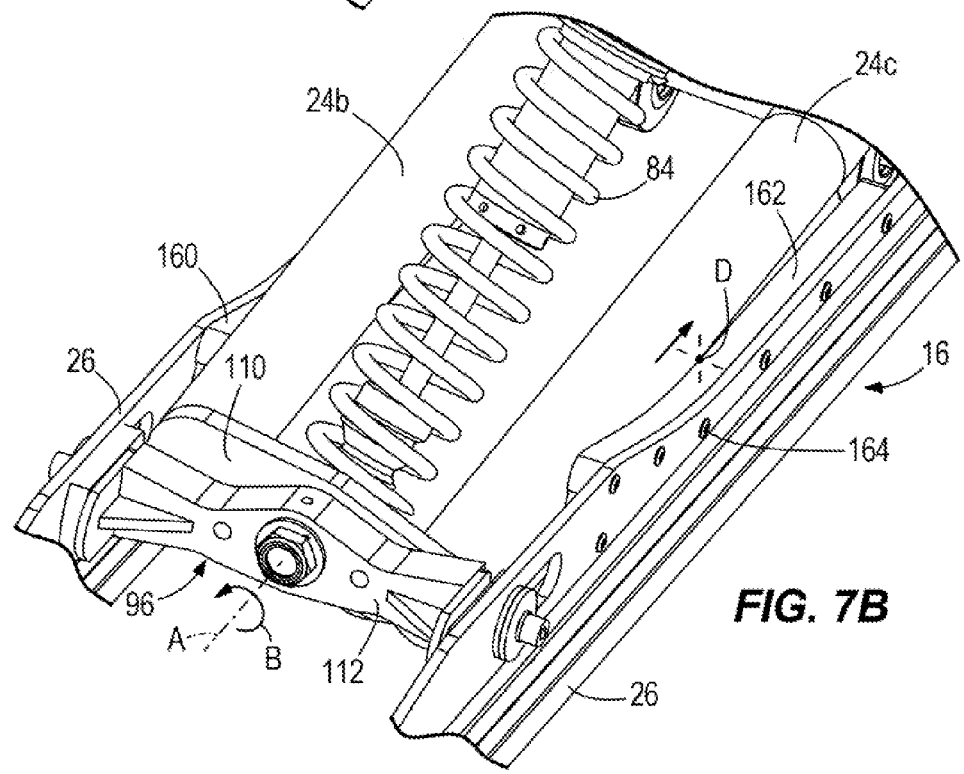

As shown in FIGS. 6A, 7A and 7B, the assembled pivot plate assembly 96 connected to the swing arm members 24b, 24c and the rear resilient member 84 is positioned between the ground contacts 26. More specifically, the sidewalls 132, 134 of the plate 112 are provided with spacer blocks 152 and screws 154, 156 are passed through washers 158, the slots 30, suitable holes (not shown) in the blocks 152 and connected with the threads 140 (FIGS. 8, 9). This connection allows the ground contacts 26 to move freely in a fore and aft direction over the length of the slots 30 and relative to the pivoting swing arm 24 during suspension travel, and thus serves to adjust the suspension assembly 16 and maintain tension of the closed-loop track 12 as it rotates and travels through rough terrain.

FIGS. 6A, 6B, 7A and 7B depict one example of random angular displacement of the suspension assembly 16 in which rotation of the plates 110, 112 occurs over an angle a as the ground contacts are displaced about the pivot axis A in a direction of the arrow B.

Advantageously, to prevent over-rotation of the ground contacts 26 with respect to the chassis of the snowmobile, preclude misalignment with respect to the drive track 12 and provide lateral support to the system 10, a pair of arm alignment guards or guides 160, 162 is provided along inboard surfaces of the ground contacts 26. The arm alignment guards 160, 162 engage with the outer circumference of the swing arm members 24b, 24c on as to block excessive rotation of the system 10 about the longitudinal axis A, and effectively force the system to counter-rotate back towards the aligned position shown in FIGS. 1A and 1B. FIG. 7A illustrates contact between the swing arm member 24c and the alignment guard 162 at a point C. FIG. 7B illustrates progressive contact between the swing arm 24c and the alignment guard 162 at a point D as angular displacement continues during suspension travel. In this example, engagement between the outer circumference of the swing arm member 24c and the alignment guard 162 will vary depending upon the compression of the front and rear resilient members 46, 84, respectively, and the rotation of the swing arm 24 about its upper end.

The arm alignment guards 160, 162 can be made of plastic, such as UMHW and can be replaceable components that are adhered or attached to the ground contacts 26 by connectors 164 such as bolts or pins. The actual length of the alignment guards 160, 162 can vary and can be selected based upon expected rotational travel of the suspension system 10 about the longitudinal axis A and vertical displacement of the suspension assembly 16. In some examples, the alignment guards 160, 162 extend longitudinally inside the ground contacts from a location adjacent the pivot plate assembly 96 at least up to the bent or curved portion 24f in the middle of the swing arm members 24b, 24c.

Figure 10:
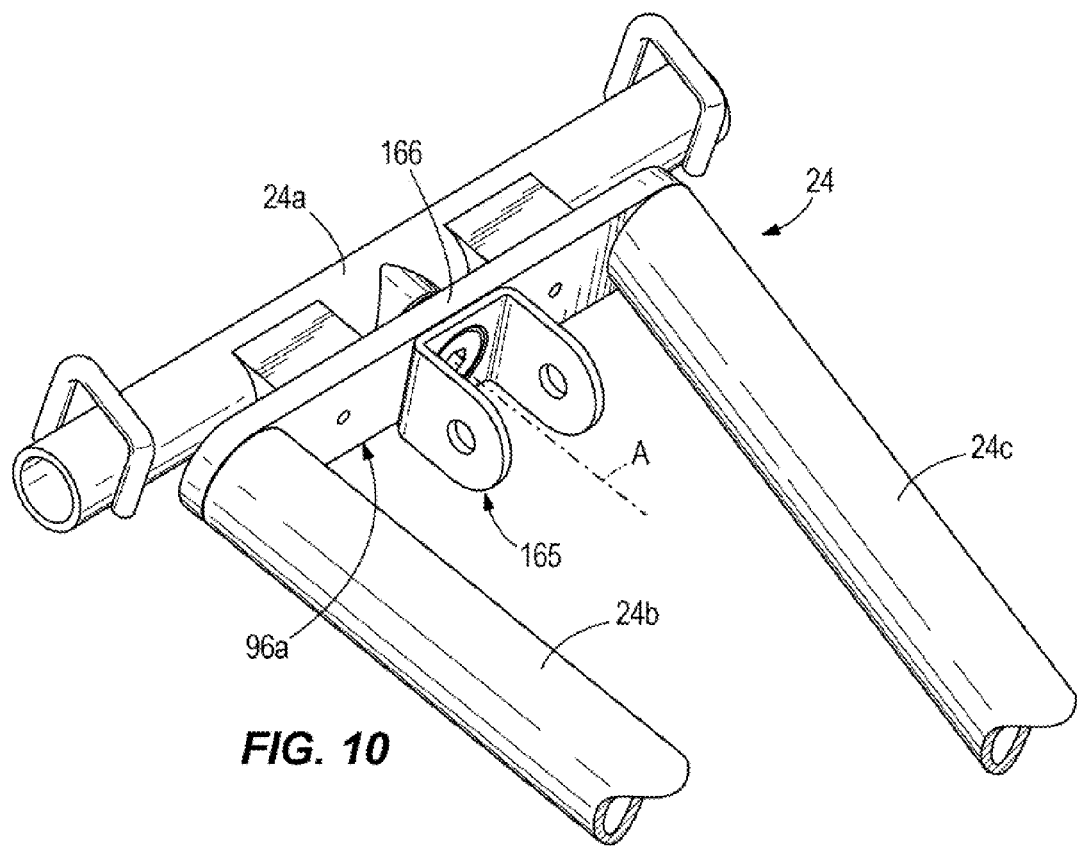
FIG. 10 is a perspective view of an upper end of the swing arm configured with a second exemplary embodiment of the pivot plate assembly for enabling rotation of the swing arm.

It should be understood that the present disclosure contemplates that the pivot arrangement 96 previously described which permits rotation of the swing arm 24 about the pivot axis A may be suitably modified to be mounted at the front end portion of the swing arm 24. As seen in the pivot arrangement or plate assembly 96a of FIG. 10, a clevis connector 165 is included on a plate assembly 166 connecting front ends of the swing arm members 24b, 24c and can be used to pivotably couple the upper end of the front resilient member 46. The plate assembly 166 is pivotably coupled about a pivot axis A to a separate transverse tube 24a attached to the chassis of the snowmobile to allow rotation of the swing arm 24 about its front end portion. Such illustration indicates the pivot arrangement 96 is not limited exclusively to the rear end portion of the swing arm 24.

Figure 11:
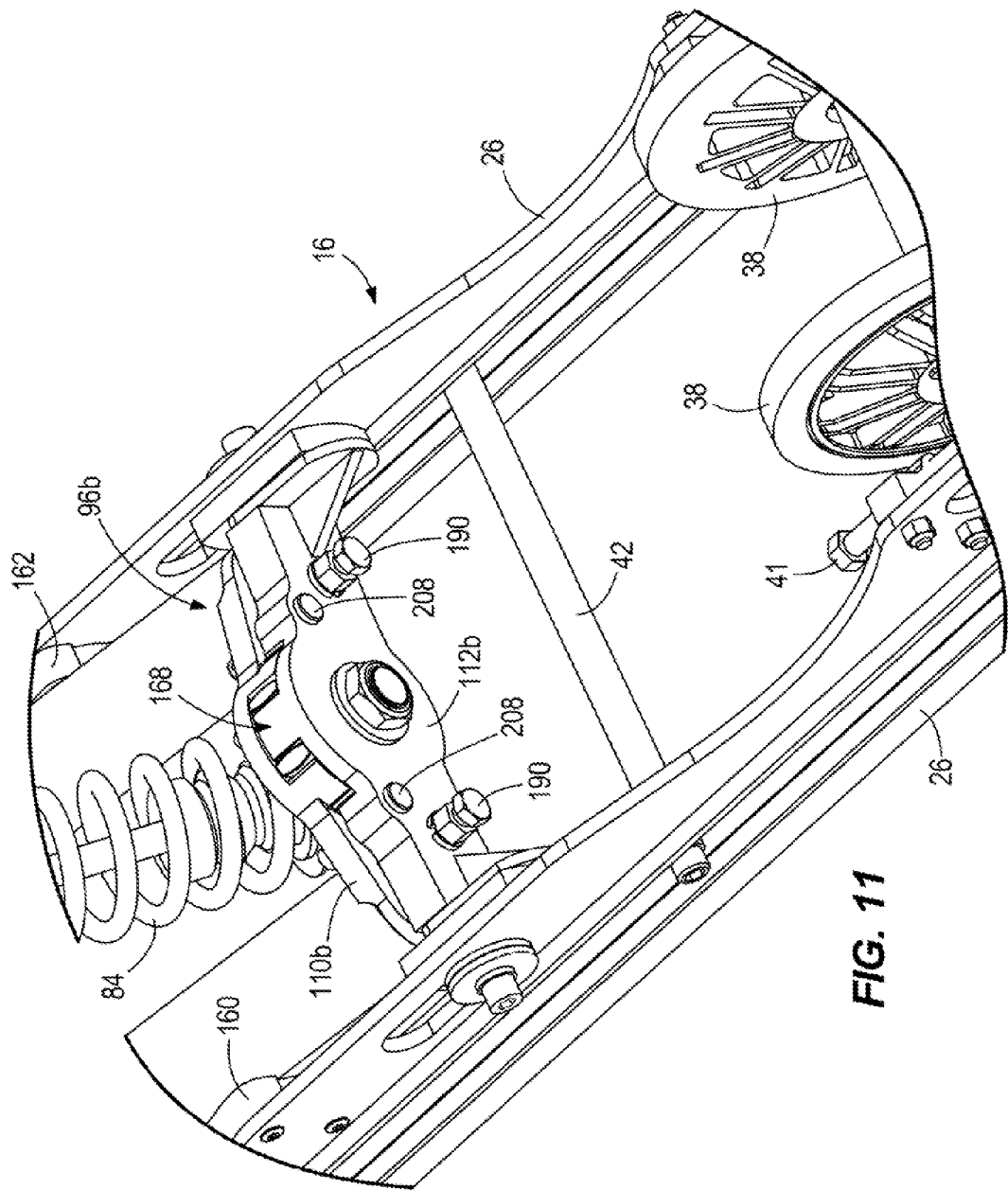
FIG. 11 is a perspective view of a third exemplary embodiment of the pivot plate assembly mounted at the lower rear end of the suspension system.
Figure 12B:
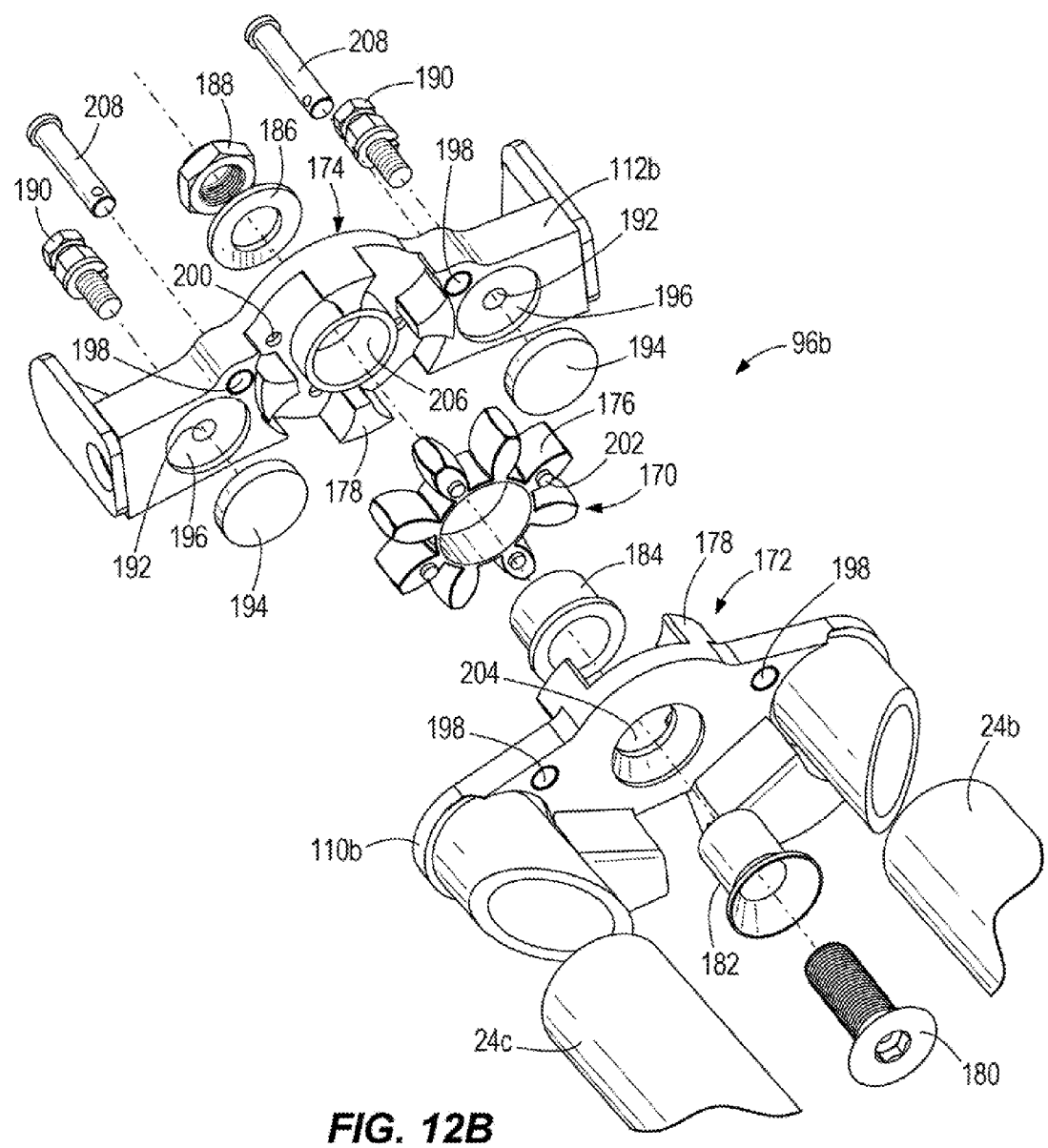

FIGS. 11, 12A and 12B illustrate a further exemplary embodiment of a pivot plate assembly 96b which provides for rotation about the longitudinal axis A while limiting the extent of relative rotation between a pair of plates 110b, 112b by using a lovejoy coupler 168 to pivotally connect the plates 110b, 112b together. The lovejoy coupler 168 includes a spider 170 which is retained between cooperating couplings 172, 174 formed on facing surfaces of the plates 110b, 112b. The lovejoy coupler 168 is configured to permit engagement of the spoke like arms 176 of the spider 170 with spaced apart jaws or lugs 178 of the couplings 172, 174, The relative spacing between the arms 176 and the lugs 178 is designed to permit a desired degree of relative rotation of the plates 110b, 112b.

The pivot plate assembly 96b further includes a threaded fastener 180, a pair of nestable bushings 182, 184, a washer 186 and a nut 188. Threaded fastener assemblies 190 are positioned in threaded holes 192 configured in the plate 112b, and engaged with disks 194 received within recesses 196 provided in the plate 112b. Throughholes 198 are formed in the plates 110b, 112b and apertures 200 are formed in facing surfaces of the plates 110b, 112b to accommodate projections 202 on the spider 170. The threaded fastener 180 is passed through the bushing 182, a central hole 204 in plate 110b, the bushing 184, the spider 176, a central hole 206 in the plate 112b, the washer 186 and threaded into the nut 188 to form the assembled pivot plate assembly 96b shown in FIG. 11. In FIG. 11, lockout pins 208 are inserted in the throughholes 198 and are suitably held in place, such as with cotter pins, so as to prevent relative rotation of the plates 110*b*, 112*b*, if desired. Similar lockout pins 208 can be inserted through apertures 124, 126 of the pivot plate assembly 96 when it is desired to prevent relative rotation of the plates 110, 112. Likewise, it is contemplated that similar lockout pins could be used to prevent rotation of pivot plate assembly 166 in FIG. 10. The lockout pins 208 are removed from the pivot plate assembly 96*b* when it is desired to not limit the extent of rotation from plates 110*b*, 112*b* during suspension travel.

Figure 12C:
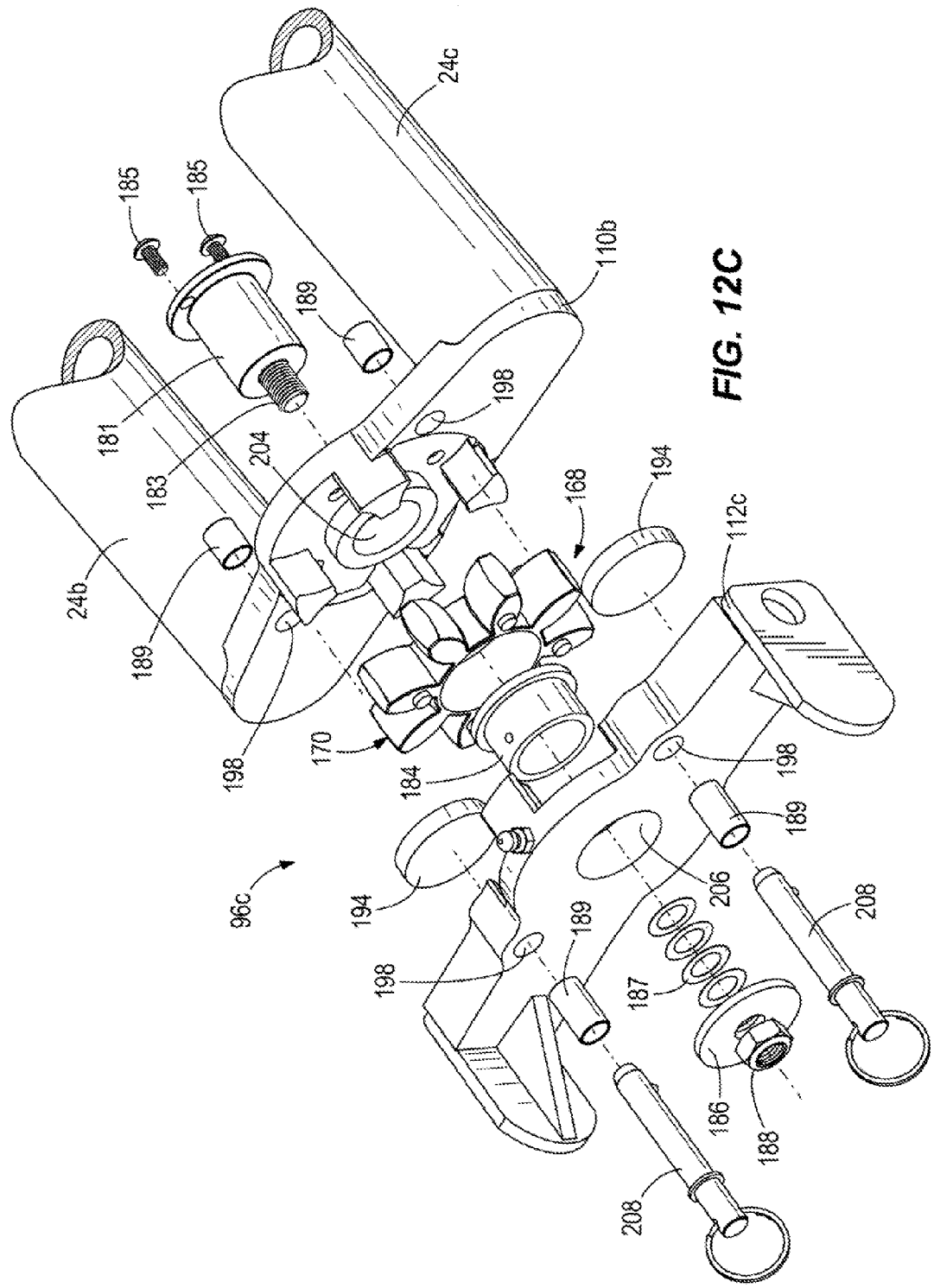
FIG. 12C is an exploded rear perspective view of a modified pivot plate assembly shown in FIG. 12A.

FIG. 12C illustrates a modified pivot plate assembly 96*c* similar to pivot plate assembly 96*b*, but replaces threaded fastener 180 and bushing 182 with a plug 181 having a threaded shaft 183, and a pair of retaining screws 185. The pivot plate assembly 96*c* further includes a set of washer-like shims 187 and a set of sleeves 189 which are press fit into the throughholes 198 formed in plates 110*b*, 112*c*. The plug 181 is passed through the central hole 204 in plate 110*b*, the spider 170, the bushing 184, the central hole 206 in plate 112*c*, the shims 187 and the washer 186, and threaded shaft 183 is threaded into nut 188. Retaining screws 185 are used to secure the plug 181 to plate 110*b*. The lockout pins 208 are inserted through the sleeves 189 and are suitably held in place, such as with cotter pins, so as to prevent relative rotation of plates 110, 112*c*. The lovejoy coupler 168 functions similarly to that described above.

Figure 13:
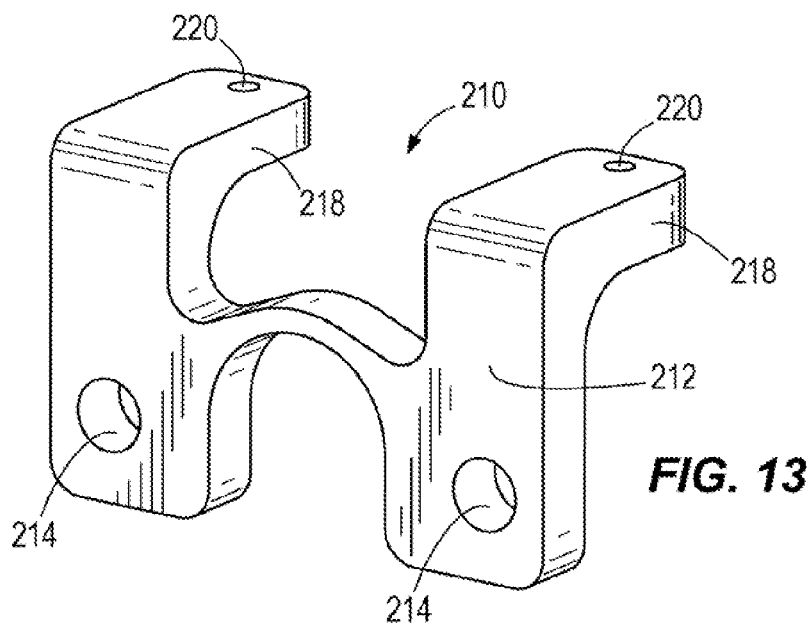
FIGS. 13, 14 and 15 are various views showing elements of a fourth exemplary embodiment of the pivot plate assembly.
Figure 15:
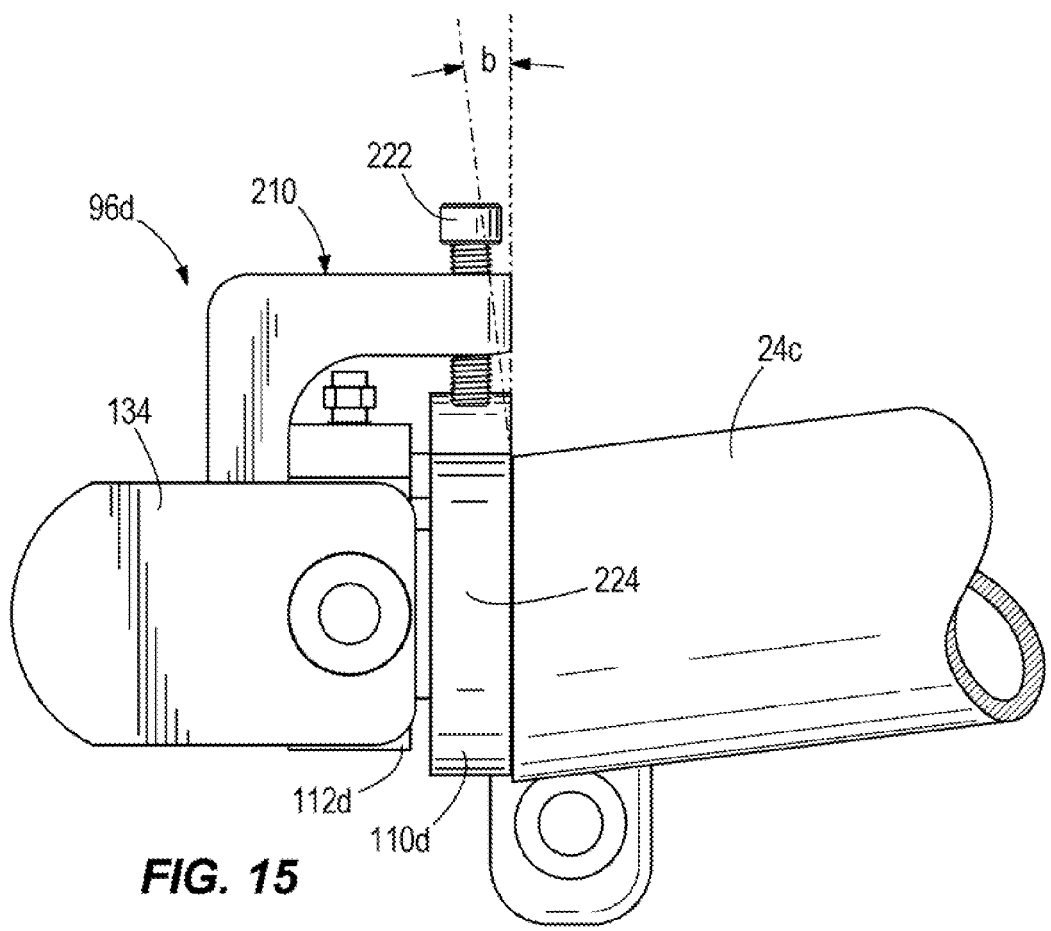
Figure 14:
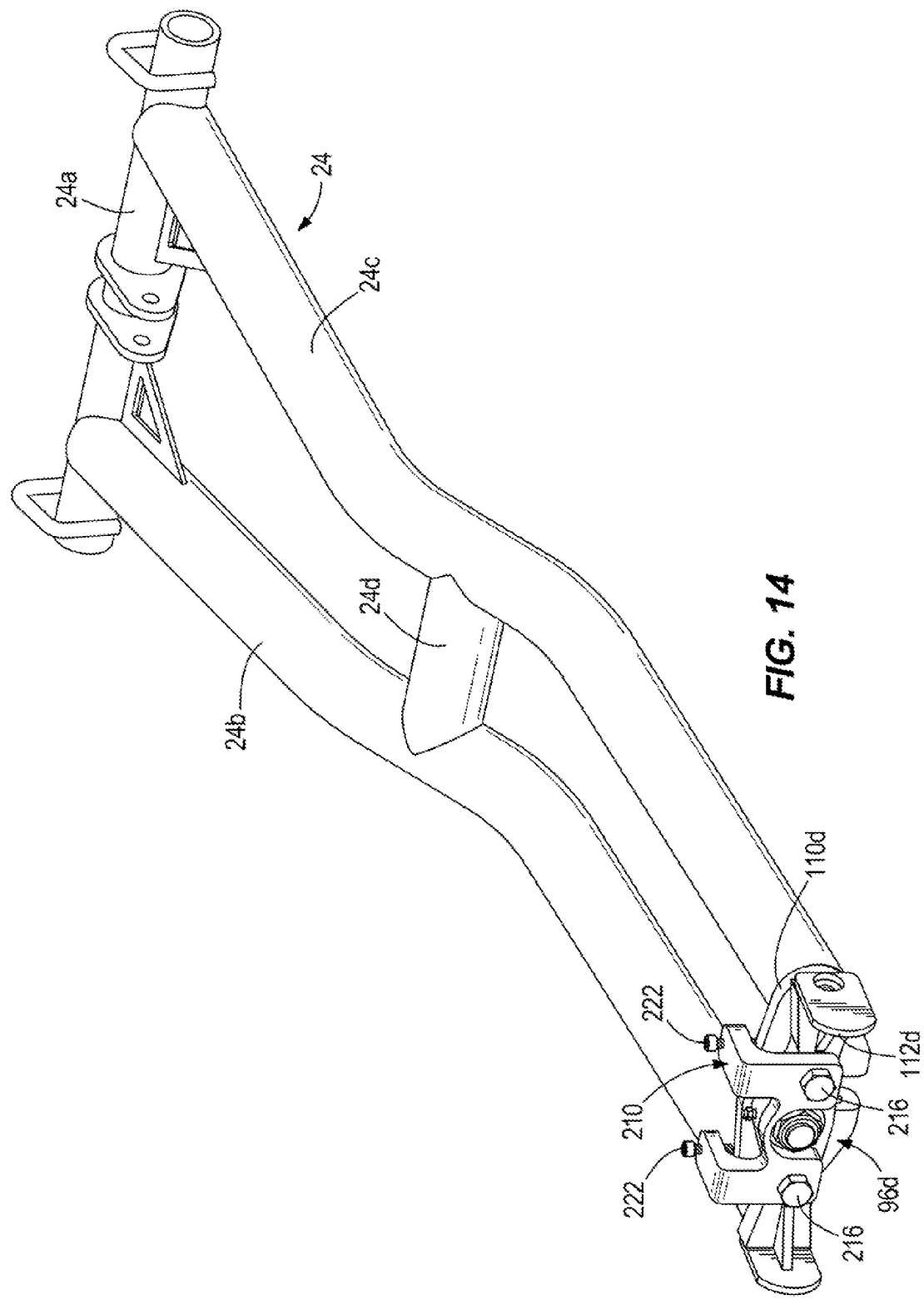

FIGS. 13, 14 and 15 illustrate elements of another exemplary embodiment of pivot plate assembly 96*d* similar to pivot plate assembly 96, but including a bracket 210 for limiting relative rotation between the plates 110*d*, 112*d*. The bracket 210 has a mounting wall 212 formed with holes 214 for receiving bolts 216 passed into the plate 112*d* to fix the bracket 210 to the plate 112*d*. The bracket 210 also has arms 218 formed with holes 220 for receiving adjustment bolts 222 which are engagable with the top of the plate 110*d*. Screwing and unscrewing the adjustment bolts 222 with respect to the arms 218 allows the user to adjust the permitted amount of relative rotation between the plates 110*d*, 112*d*. More specifically, screwing the bolts 222 down with respect to the arms 218 causes bottom ends of the bolts 222 to be positioned closer to the tops of the plates 110*d* which allows for less relative rotation between plates 110*d*, 112*d*. Conversely, unscrewing the bolts 222 with respect to the arms 218 causes bottom ends of the bolts 222 to be positioned further away from the top of the plate 110*d* thus allowing for more relative rotation between the plates 110*d*, 112*d*.

Referring now to FIG. 15, through experimentation the inventors have found that mounting the forward facing surface of the plate 110*d* to the lower ends 224 of the swing arm members, one being shown here as 24*c*, at an acute angle measured from the vertical has been found to provide surprisingly effective results. Angle b is preferably set at 7 degrees, but such angle may vary plus or minus 3 degrees while still achieving effective results during suspension travel.

The benefits and advantages of the suspension system will thus be appreciated by those skilled in the art. For example, by recognizing that ground forces acting on the suspension assembly during snowmobile travel (e.g. due to bumps) must travel through the longitudinal pivot plate assembly before affecting the chassis and the rider, it is contemplated that the combined provision of the pivot plate assembly, the alignment guards, the spherical joint assemblies and the mounting of the swing arm to the pivot plate assembly contribute to an enhanced handling and performance and ride of the snowmobile.

It should be understood that certain changes may be made in the design and construction set forth without departing from the spirit or the scope of the invention. For example, the present disclosure contemplates various other arrangements for limiting the extent of and/or preventing the rotation provided by pivot arrangements 96, 96*a*, 96*b*, 96*c* and 96*d*. In addition, the present disclosure further contemplates the use of a universal joint or the like for providing universal pivoting of the swing arm 24 about multiple axes in lieu of the pivoting about the pivot axis A as described herein. It is intended that all matter contained in this description and shown in the drawings should be interpreted as illustrative and not in a limiting sense.

It should also be understood that the following claims are intended to cover all of the generic and specific features of the invention herein described, and all statements of the scope of the invention, which as a matter of language might be said to fall therebetween.

What is claimed is:

1. A suspension assembly adapted for use with a snowmobile using a chassis enclosing a drive system for rotatably driving a closed-loop track, the suspension assembly comprising:
   at least one elongated ground contact engaged with the closed-loop track;
   an elongated swing arm angularly disposed in the closed-loop track, the swing arm extending between a front end portion adapted to be coupled to the chassis, and a rear end portion coupled to the at least one ground contact;
   a front resilient member disposed in the closed-loop track and having an upper end pivotably coupled to the front end portion of the swing arm, and a lower end pivotably coupled to the at least one ground contact;
   a rear resilient member disposed in the closed-loop track and having an upper end adapted to be pivotably connected to the chassis, and a lower end pivotably coupled to the at least one ground contact; and
   a pivot arrangement coupled to one of the front end portion and the rear end portion of the swing arm for permitting at least rotation of the swing arm about a pivot axis extending longitudinally of the at least one ground contact, wherein the pivot arrangement is provided with separate members having respective rear and front surfaces facing each other, the separate members being connected together one in front of another for rotation relative to one another about the pivot axis, and
   wherein the at least one ground contact is configured to receive the separate members such that the ground contact is movable in fore and aft directions relative to the swing arm and the separate members during travel of the suspension assembly.

2. The suspension assembly of claim 1, wherein the pivot arrangement is comprised of a plate assembly connected to the front end portion of the swing arm, and pivotally connected about the pivot axis to a member adapted to be connected to the chassis of the snowmobile.

3. The suspension assembly of claim 2, wherein the plate assembly is provided with a connector adapted to couple with the upper end of the front resilient member.

4. The suspension assembly of claim 1, wherein the pivot arrangement is comprised of a plate assembly provided with a pair of plates connected together for rotation relative to one another about the pivot axis.

5. The suspension assembly of claim 4, wherein a first plate is connected to the rear end portion of the swing arm and the lower end of the rear resilient member, and a second plate is connected to the at least one ground contact such that the ground contact and swing arm are arranged for relative rotation about the pivot axis.

6. The suspension assembly of claim 5, wherein the first plate is fixedly secured to the rear end portion of the swing arm, and is pivotally connected to the lower end of the rear resilient member.

7. The suspension assembly of claim 1, wherein the at least one ground contact is comprised of a pair of spaced apart ground contacts.

8. The suspension assembly of claim 7, wherein arm alignment guards are constructed on the pair of spaced apart ground contacts for providing lateral support thereof and are configured for engagement with the swing arm.

9. The suspension assembly of claim 1, wherein the upper end of the front resilient member is provided with a first spherical joint assembly, and the lower end of the front resilient member is provided with a second spherical joint assembly.

10. The suspension assembly of claim 9, wherein the lower end of the rear resilient member is provided with a third spherical joint assembly.

11. A suspension assembly adapted for use in a snowmobile having a chassis enclosing a drive system for rotatably driving a closed-loop track, the suspension assembly comprising:
at least one elongated ground contact engaged with the closed-loop track;
an elongated swing arm angularly disposed in the closed-loop track, the swing arm extending between a front end portion adapted to be coupled to the chassis, and a rear end portion coupled to the at least one ground contact;
a front resilient member disposed in the closed-loop track and having an upper end pivotally coupled to the front end portion of the swing arm, and a lower end pivotally coupled to the at least one ground contact;
a rear resilient member disposed in the closed-loop track and having an upper end adapted to be pivotally connected to the chassis, and a lower end pivotally connected to the at least one ground contact; and
a pivot plate assembly provided with a pair of separate plates having respective rear and front surfaces facing each other, the plates being connected together one in front of another for rotation relative to one another about a pivot axis extending longitudinally of the at least one ground contact, a first plate being connected to the rear end portion of the swing arm and the lower end of the rear resilient member, and a second plate being connected to the ground contact,
wherein the at least one ground contact and the swing arm are arranged for relative rotation about the pivot axis.

12. The suspension assembly of claim 11, wherein the first plate is fixedly secured to the rear end portion of the swing arm, and is pivotally connected to the lower end of the rear resilient member.

13. The suspension assembly of claim 11, wherein the at least one ground contact is comprised of a pair of spaced apart ground contacts, and the pivot plate assembly is positioned between the pair of spaced apart ground contacts.

14. The suspension assembly of claim 13, wherein the pair of spaced apart ground contacts is provided with arm alignment guards engagable with the swing arm along the length thereof for preventing over-rotation of the ground contacts about the pivot axis.

15. The suspension assembly of claim 14, wherein the swing arm extends rearwardly and downwardly along a bent portion located between the front end portion and the rear end portion, and arm alignment guards are provided on inner surfaces of the ground contacts between the pivot plate assembly and the bent portion.

16. The suspension assembly of claim 11, wherein the upper end of the front resilient member is provided with a first spherical joint assembly and the lower end of the front resilient member is provided with a second spherical joint assembly.

17. The suspension assembly of claim 16, wherein the lower end of the rear resilient member is provided with a third spherical joint assembly.

18. The suspension assembly of claim 11, wherein the pivot plate assembly is constructed with a lockout arrangement for preventing relative rotation between the first plate and the second plate.

19. The suspension assembly of claim 18, wherein the lockout arrangement includes a set of lockout pins which extend through the first plate and the second plate.

20. The suspension assembly of claim 11, wherein the pivot plate assembly is constructed with a rotation limiting arrangement for restricting relative rotation between the first plate and the second plate.

21. The suspension assembly of claim 20, wherein the rotation limiting arrangement includes a lovejoy coupler positioned between the first plate and the second plate.

22. The suspension assembly of claim 20, wherein the rotation limiting arrangement includes a bracket connected to the second plate and provided with an arm arrangement having adjustment bolts which are engagable with the first plate.

23. The suspension assembly of claim 11, wherein the rear end portion of the swing arm is connected to the first plate at an angle in the range of 4 degrees-10 degrees.

24. The suspension assembly of claim 11, wherein the rear end portion of the swing arm is connected to the first plate at an angle of 7 degrees.

25. A suspension assembly adapted for use in a snowmobile having a chassis enclosing a drive system for rotatably driving a closed-loop track, the suspension assembly comprising:
a pair of spaced elongated ground contacts engaged with the closed-loop track;
an elongated swing arm angularly disposed in the closed-loop track, the swing arm extending between a front end portion adapted to be coupled to the chassis, and a rear end portion coupled to the pair of ground contacts, the swing arm having an elongated portion extending between the pair of ground contacts;
a front resilient member disposed in the closed-loop track having an upper end pivotally connected to the front end portion of the swing arm, and a lower end pivotally coupled to the pair of ground contacts;
a rear resilient member disposed in the closed-loop track and having an upper end adapted to be pivotally connected to the chassis, and a lower end pivotally coupled to the pair of ground contacts;
a pivot arrangement connected to the swing arm for permitting at least rotation of the elongated portion of the swing arm between the pair of ground contacts about a pivot axis extending longitudinally of the pair of ground contacts;
wherein the pivot arrangement includes an arrangement for providing at least one of restricting and preventing rotation of the swing arm about the pivot axis and between the pair of ground contacts.

* * * * *